United States Patent
Ito

(10) Patent No.: US 7,330,215 B2
(45) Date of Patent: Feb. 12, 2008

(54) DIGITAL CAMERA, CRADLE AND CAMERA SYSTEM

(75) Inventor: Takeyoshi Ito, Asaka (JP)

(73) Assignee: Fujifilm Corp., Tokyo (JP)

( * ) Notice: Subject to any disclaimer, the term of this patent is extended or adjusted under 35 U.S.C. 154(b) by 951 days.

(21) Appl. No.: 10/043,231

(22) Filed: Jan. 14, 2002

(65) Prior Publication Data

US 2002/0093583 A1 Jul. 18, 2002

(30) Foreign Application Priority Data

Jan. 16, 2001 (JP) ............................. 2001-008067

(51) Int. Cl.
*H04N 5/225* (2006.01)
(52) U.S. Cl. ...................... 348/375; 348/373
(58) Field of Classification Search ............ 348/207.1, 348/207.11, 373, 374, 375
See application file for complete search history.

(56) References Cited

U.S. PATENT DOCUMENTS

| | | | | |
|---|---|---|---|---|
| 5,845,166 A * | 12/1998 | Fellegara et al. | ............ | 396/429 |
| 6,111,604 A * | 8/2000 | Hashimoto et al. | ....... | 348/220.1 |
| 6,275,882 B1 * | 8/2001 | Cheever et al. | ............. | 710/302 |
| 6,633,231 B1 * | 10/2003 | Okamoto et al. | ...... | 340/539.11 |
| 6,693,665 B1 * | 2/2004 | Shindo et al. | ........... | 348/207.2 |
| 6,829,004 B1 * | 12/2004 | Abe | ............................. | 348/96 |
| 2002/0071035 A1 * | 6/2002 | Sobol | .......................... | 348/207 |
| 2005/0062883 A1 * | 3/2005 | Whitby et al. | .............. | 348/375 |

FOREIGN PATENT DOCUMENTS

| | | |
|---|---|---|
| EP | 0 949804 A2 * | 10/1999 |
| JP | 6-153044 A | 5/1994 |
| JP | 6-351012 A | 12/1994 |
| JP | 8-251526 A | 9/1996 |
| JP | 9-271019 A | 10/1997 |
| JP | 2000-152047 A | 5/2000 |
| JP | 2000-175092 A | 6/2000 |
| JP | 2000-350132 A | 12/2000 |
| JP | 2000-354227 A | 12/2000 |

\* cited by examiner

*Primary Examiner*—Tuan Ho
(74) *Attorney, Agent, or Firm*—Birch, Stewart, Kolasch & Birch, LLP

(57) ABSTRACT

Operations when connected to a personal computer and when charging a battery in a camera are made simple and easy to understand, and also a camera operation mode can be automatically changed to a communication mode. A digital camera has on its bottom a camera connector having a USB terminal, a DC input terminal and so on, and a cradle to have the digital camera mounted thereon has a cradle connector to be connected to the camera connector in synchronization with an operation of mounting the camera provided. The cradle has a power supply switch, a USB jack, a DC jack and so on provided thereon, and they are connected to the cradle connector. If the power supply switch is turned on with the digital camera mounted on the cradle, the digital camera starts up in a USB mode.

12 Claims, 7 Drawing Sheets

DIGITAL CAMERA, CRADLE AND CAMERA SYSTEM

BACKGROUND OF THE INVENTION

1. Field of the Invention

The present invention relates to a digital camera, a cradle and a camera system, and in particular, to the digital camera, the cradle and the camera system suitable for two-way communication with an external apparatus such as a personal computer for performing two-way communication.

2. Description of the Related Art

In the conventional method of inputting an image captured by a digital camera to a personal computer, the digital camera is connected to the personal computer with a communication cable to have two-way communication performed between them via the cable so that the image is captured into the personal computer.

An AC adapter plug is inserted in a DC power input terminal (DC input terminal) of the digital camera so that the camera is driven when the camera power supply is on and a battery in the camera is charged when the camera power supply is off by the power inputted from the DC input terminal.

However, there is a problem that it is troublesome to connect the digital camera to the personal computer with the communication cable each time the image is captured from the digital camera into the personal computer. If the battery of the digital camera is consumed during the communication between the camera and the personal computer and the communication becomes impossible, a failure such as an imperfect image remaining in the personal computer or destruction of data occurs. Moreover, in the case of charging the battery in the digital camera, the AC adapter plug must be inserted in the DC input terminal of the camera, while such charging work is apt to be forgotten so that there are cases where the camera cannot be used when necessary since the battery is not charged.

Even in the case where the communication cable is connected to the digital camera, it is started as an ordinary camera if it is turned on when the power of the personal computer is off or the communication cable is off the personal computer. To be more specific, a lens cover opens and a taking lens is let out to be on standby for image-capturing in the case where a camera operation mode is an image-capturing mode, and reproduction of an image recorded on a memory card is started in the case of a reproduction mode. Thus, there are the cases where it performs a camera operation different from what a user intended, leading to a possibility of causing a wrong operation or a misunderstanding.

SUMMARY OF THE INVENTION

The present invention is implemented in consideration of such circumstances, and its object is to provide the digital camera, cradle and camera system wherein the operations when connected to the personal computer and when charging the battery in the camera are simple and easy to understand, and the camera operation mode is automatically changed to a communication mode or gives a warning to call attention when incapable of the communication, and furthermore, the power is never shut down during the communication, and an on/off state of the camera power supply, a communication state and so on can be visibly displayed.

To attain the above described object, the present invention is directed to a digital camera to be mounted on a cradle having a first communication terminal through which an external apparatus capable of two-way communication is connected so that the digital camera performs two-way communication with the external apparatus, the digital camera comprising: a second communication terminal which is connected to the first communication terminal when the digital camera is mounted on the cradle. To be more specific, it is possible, by mounting the digital camera on the cradle, to automatically connect the first and second communication terminals, which allows the two-way communication with the personal computer and so on.

Preferably, the digital camera further comprises: a detection device which detects the digital camera being mounted on the cradle, wherein when the detection device detects the digital camera being mounted on the cradle, the digital camera changes an operation mode thereof. Preferably, the digital camera further comprises: a detection device which detects the digital camera being mounted on the cradle, wherein when the detection device detects the digital camera being mounted on the cradle, the digital camera sets an operation mode thereof at a communication mode for communicating with the external apparatus. To be more specific, irrespective of the operation mode of the camera body, the camera operation mode is automatically changed to one suitable for using the cradle once the digital camera is mounted on the cradle so as to prevent a camera operation that is different from what a user intended.

Preferably, the digital camera further comprises: a detection device which detects the digital camera being mounted on the cradle; and at least one of an image display device and a character display device, wherein if communication between the digital camera and the external apparatus is impossible when the detection device detects the digital camera being mounted on the cradle, the at least one of the image display device and the character display device displays an warning. To be more specific, in the case where the two-way communication with the personal computer is impossible in spite of the digital camera mounted on the cradle, there are possibilities such as the power of the personal computer is not on and the communication cable is off so that a warning thereof is given to prompt the user to take appropriate measures.

Preferably, the digital camera further comprises: a device which turns a camera power supply on and off according to an operation of a power supply switch provided at the cradle. When the camera power supply is turned on by the operation of the power supply switch provided at the cradle, the digital camera can set an operation mode thereof at a communication mode for communicating with the external apparatus. Preferably, the digital camera further comprises: a second terminal which is connected to a first terminal provided at the cradle when the digital camera is mounted on the cradle, a signal according to the operation of the power supply switch being outputted through the first terminal. To be more specific, when the digital camera is mounted on the cradle, the camera can be turned on or off by the power supply switch (one placed on the cradle) different from that of the camera body, and it is automatically set at the communication mode if the camera power supply is turned on by this other switch.

Preferably, the digital camera further comprises: a power input terminal which is connected to a power output terminal provided at the cradle when the digital camera is mounted on the cradle, DC power being outputted through the power output terminal; and a charging device which charges a battery in the digital camera by the DC power inputted through the power input terminal when the camera power supply is turned off, the charging device prohibiting charging of the battery when the camera power supply is turned on. To be more specific, in a state where the digital camera is mounted on the cradle, the battery in the camera is charged by the DC power inputted via the cradle in the case where the camera power supply is off, and the charging is prohibited in the case where the camera power supply is on so as to allow the two-way communication via the cradle.

Preferably, the digital camera further comprises an audio/video output terminal which is connected to an audio/video input terminal provided at the cradle when the digital camera is mounted on the cradle. To be more specific, it is allowed, by mounting the digital camera on the cradle, to connect the audio/video output terminal to the audio/video input terminal and output the audio/video from the digital camera to TV and so on via the cradle.

Preferably, the cradle has a recess which guides the digital camera; the first communication terminal, power output terminal or audio/video input terminal of the cradle is arranged at a bottom of the recess; the second communication terminal, power input terminal or audio/video input terminal of the digital camera is arranged at a bottom of the digital camera; and the terminal of the digital camera is connected to the terminal of the cradle in synchronization with operation of mounting the digital camera on the cradle.

Preferably, the digital camera further comprises: a power input terminal which is connected to a power output terminal provided at the cradle when the digital camera is mounted on the cradle, DC power being outputted through the power output terminal; and a device which turns on the camera power supply by operation of a power supply switch provided at the cradle on condition that the DC power is supplied through the power input terminal. To be more specific, while the two-way communication with the personal computer and so on is performed in the case where the camera power supply is turned on by the power supply switch placed on the cradle, turning on the camera power supply is only permitted when the camera power is supplied via the cradle so as not to shut down the camera power supply during the communication.

The present invention is also directed to a cradle which connects a digital camera to an external apparatus capable of two-way communication, the cradle comprising: a camera mounting section on which the digital camera is removably mounted; and a first communication terminal which is connected to the external apparatus, the first communication terminal being connected to a second communication terminal provided at the digital camera when the digital camera is mounted on the digital camera mounting section.

Thus, once the digital camera is mounted on the camera mounting section, it is possible to connect the digital camera to the personal computer and so on so as to be capable of the two-way communication.

Preferably, the cradle further comprises a power supply switch which turns on and off a power supply of the digital camera. Preferably, the cradle further comprises a second terminal through which a signal according to the operation of the power supply switch is outputted, wherein when the digital camera is mounted on the digital camera mounting section, the second terminal is connected to a first terminal provided at the digital camera to turn on and of the power supply of the digital camera. Thus, in the state where the digital camera is mounted on the cradle, the camera power supply can easily be turned on or off by the power supply switch on the cradle side even in the case where the power supply switch on the camera body side is hard to operate.

Preferably, the cradle further comprises: a display input terminal which is connected to a display output terminal provided at the digital camera when the digital camera is mounted on the digital camera mounting section, a display signal being outputted through the display output terminal; and a display device which displays at least one of a communication state between the digital camera and the external apparatus and an on/off state of the camera power supply according to the display signal inputted through the display input terminal. Thus, in the state where the digital camera is mounted on the cradle, it is easy to check by a display device on the cradle side the communication state (in communication, remove OK) or the on or off state of the camera power supply even in the case where it is difficult to do so by the display device on the camera body side.

Preferably, the cradle further comprises: a power output terminal which is connected to a power input terminal provided at the digital camera when the digital camera is mounted on the digital camera mounting section, DC power being inputted through the power input terminal. Preferably, the cradle further comprises an audio/video input terminal which is connected to an audio/video output terminal provided at the digital camera when the digital camera is mounted on the digital camera mounting section. To be more specific, the above cradle functions as the device which supplies the DC power to the digital camera and outputs audio/video signals from the digital camera to TV and so on.

Preferably, the digital camera mounting section has a recess which guides the digital camera; the first communication terminal, power output terminal or audio/video input terminal of the cradle is arranged at a bottom of the recess; the second communication terminal, power input terminal or audio/video output terminal of the digital camera is arranged at a bottom of the digital camera; and the terminal of the digital camera is connected to the terminal of the cradle in synchronization with operation of mounting the digital camera on the cradle.

The present invention is also directed to a camera system comprising the above-described digital camera and cradle.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE
PREFERRED EMBODIMENTS

Hereunder, preferred embodiments of a digital camera, a cradle and a camera system related to the present invention will be described in accordance with the accompanied drawings.

First, a system configuration wherein the camera system related to the present invention is applied will be described.

Figure 1:
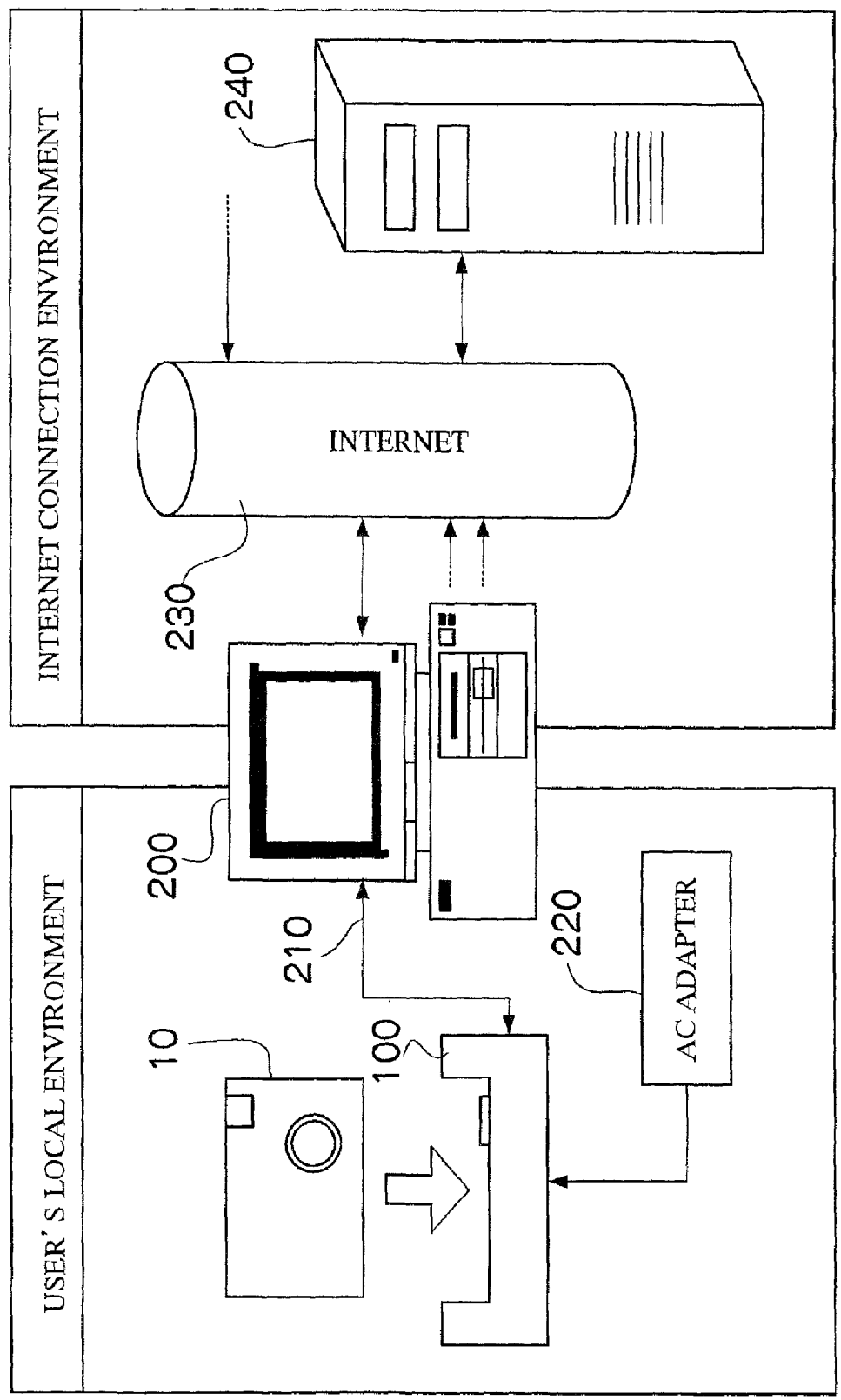
FIG. 1 is a block diagram of an entire system configuration to which a camera system related to the present invention is applied.

As shown in FIG. 1, the camera system related to the present invention is comprised of a digital camera 10 and a cradle 100 on which this digital camera 10 is mounted.

The cradle 100 is connected to a communication cable (a USB cable in this embodiment) 210 capable of two-way communication with a personal computer 200 and also has DC power supplied from an AC adapter 220.

The personal computer 200 is capable of sending and receiving information such as an image from the digital camera 10 via the cradle 100 and the USB cable 210, and also sending and receiving information such as the image and voice to and from a server 240 and so on via a communication network such as the Internet 230.

It is possible, by configuring such a system and just by mounting the digital camera 10 on the cradle 100, to send the image in the digital camera 10 to the server 240 via the cradle 100, the USB cable 210, the personal computer 200 and the communication network and enjoy various services related to the image on the server 240.

As the digital camera 10 is mounted on the cradle 100, the personal computer 200 automatically detects (using a Plug & Play function) a connection of the digital camera 10, and automatically starts an image viewer that is application software for displaying a list of the images in the digital camera 10. For instance, as for the function of automatically detecting the connection of the digital camera 10, a device driver for automatically detecting the connection of the digital camera 10 on or after starting a system program of the personal computer 200 is installed to monitor a Plug & Play event of a communication system. If the device driver recognizes the connection of the digital camera 10, it starts a necessary processing program such as the image viewer according to a processing mode of the digital camera 10.

Figure 2:
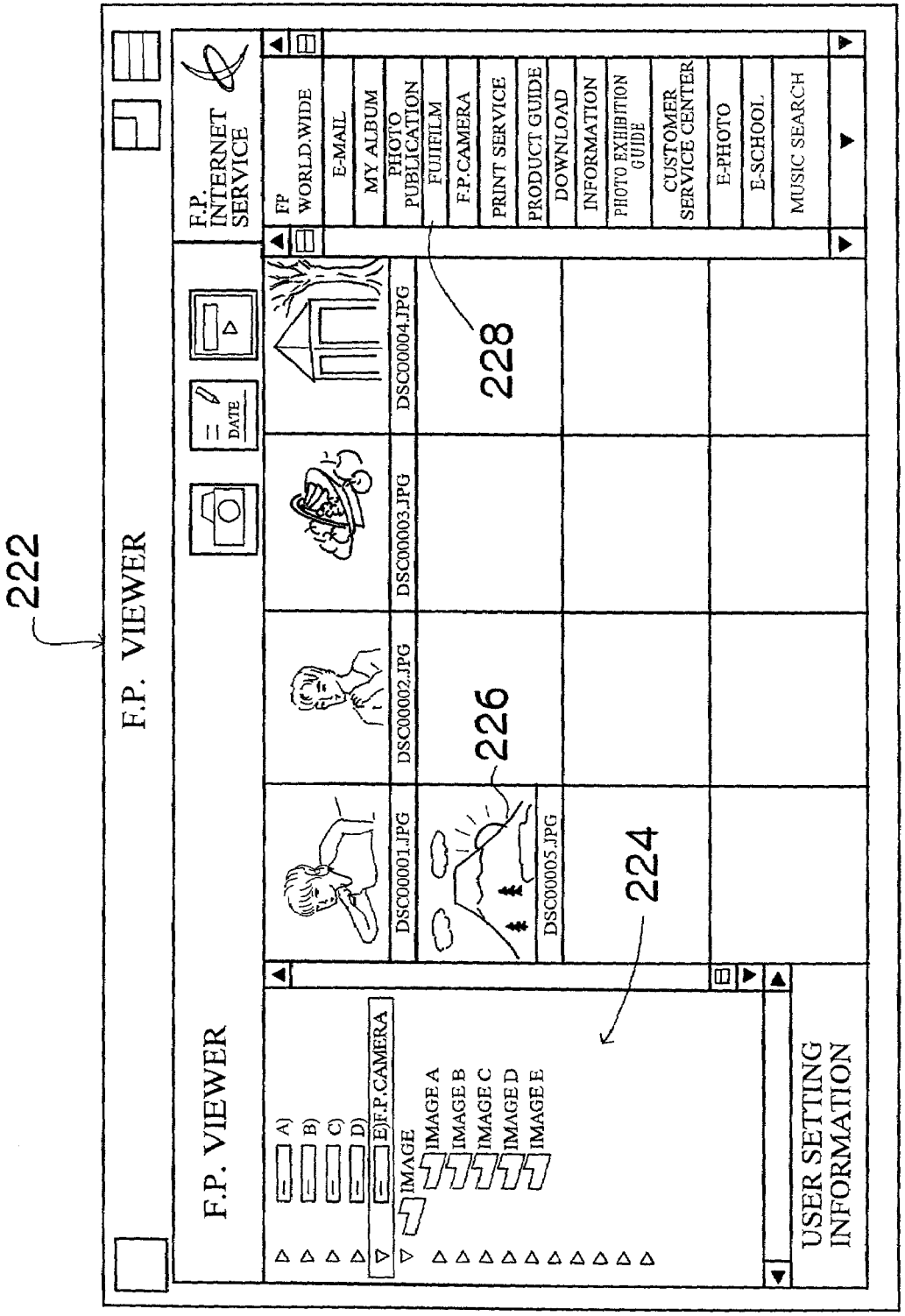
FIG. 2 is a drawing showing a display screen of an image viewer displayed on a monitor of a personal computer shown in FIG. 1.

FIG. 2 shows a display screen of the image viewer displayed on a monitor of the personal computer 200.

In the display screen 222 displayed by the image viewer, for instance, a file list 224 having identifying information on captured image data and attendant information recorded on a record medium of the digital camera 10 and the identifying information on folder names and file names of stored image data and the attendant information recorded in a database of the personal computer 200 listed, a list of contracted images (identifying information by thumb-nail images) 226 of the images recorded in a folder directed to be browsed by a user and a menu of various services provided by the server and so on are displayed, and various direction buttons 228 for directing the connection to the server 240 performing various services are simultaneously displayed.

It is possible for the user to send print service information of a desired image and upload an image file and a voice file for contributing to a photo publication service and a photo contest on the Internet just by selecting one or a plurality of the desired images from the displayed file names or list of the contracted images 226 with an input device represented by a mouse or a keyboard and pushing the direction buttons 228 (a print service button, a photo publication button or a photo contest contribution button and so on, for instance) for directing connection and transmission to various servers.

Next, the digital camera 10 used for the above system will be described.

FIGS. 3 to 7 are a front view, a rear view, a plan view, a bottom view and a right side view, respectively, showing an external view of the digital camera 10.

Figure 3:
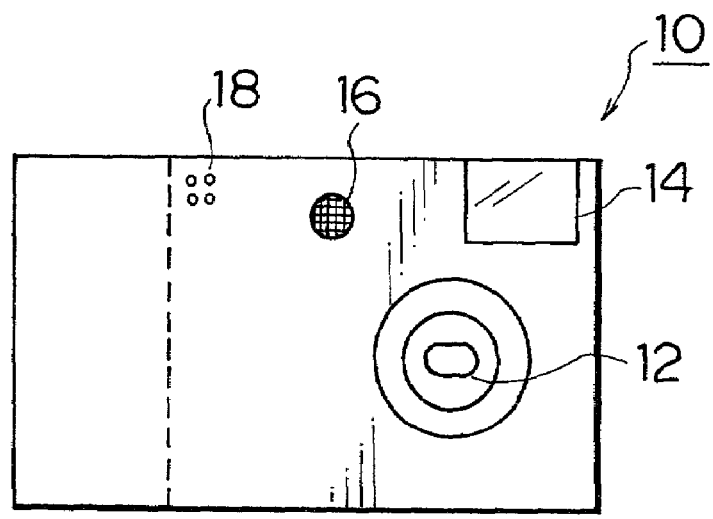
FIG. 3 is a front view showing appearance of a digital camera related to the present invention.

As shown in FIG. 3, the digital camera 10 has a body-contained taking lens 12, a finder window 14, a self-timer LED 16 and a microphone 18 provided on its front. The digital camera 10 has a lens cover, which is not shown, to be opened and closed at the body-contained position of the above described taking lens 12 provided on its front.

Figure 4:
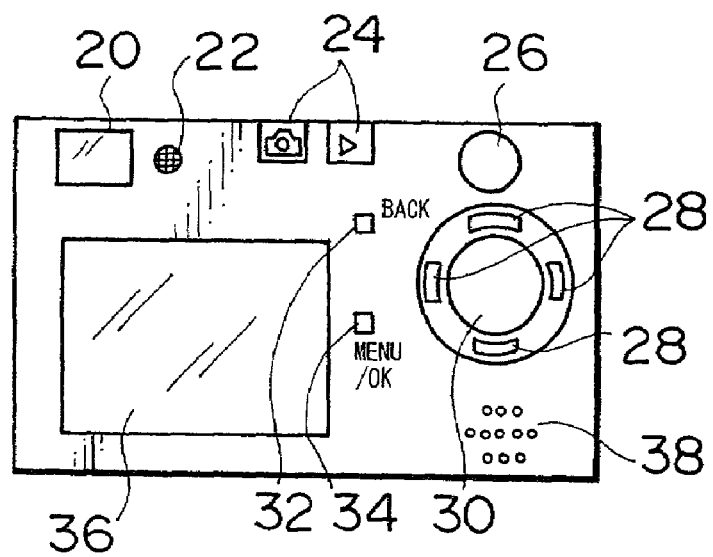
FIG. 4 is a rear view of the digital camera shown in FIG. 1.

As shown in FIG. 4, the digital camera 10 has a finder 20, a two-colored (red and green) finder LED 22 for indicating a power-on, image-capturing standby, charging an electric flash, in USB data communication and so on by lighting and blinking, an image-capturing/reproduction mode selecting switch 24, an image-capturing mode selecting dial 26, a multifunction cross key 28, a dot matrix liquid crystal display 30 for indicating a camera operation mode, a function of the cross key 28 and so on by characters and icons, a back switch 32, a menu/OK switch 34, a liquid crystal monitor 36 for displaying the image, a speaker 38 and so on provided on its back.

Figure 5:
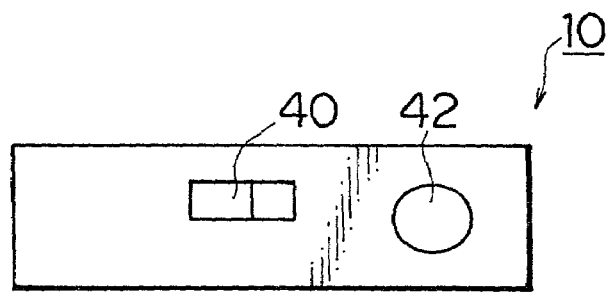
FIG. 5 is a plan view of the digital camera shown in FIG. 1.
Figure 6:
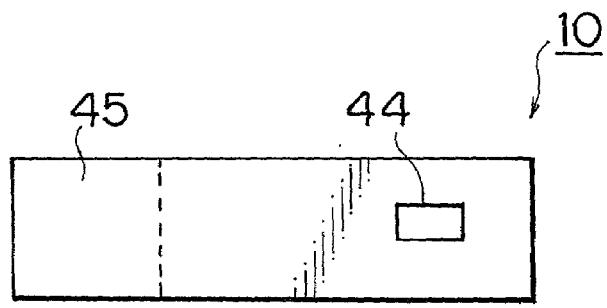
FIG. 6 is a bottom view of the digital camera shown in FIG. 1.

Moreover, as shown in FIG. 5, the digital camera 10 has a power supply switch 40 and a shutter button 42 provided on its topside, and as shown in FIG. 6, it has a camera connector 44 and a battery cover 45 for opening and closing a battery storage section on its underside.

Figure 7:
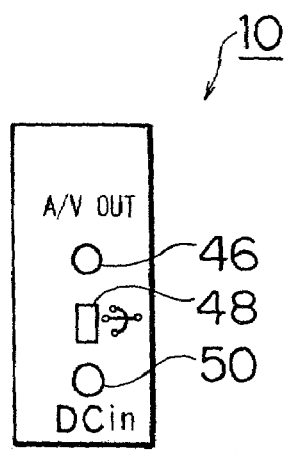
FIG. 7 is a right side view of the digital camera shown in FIG. 1.

As shown in FIG. 7, the digital camera 10 has an audio/video (A/V) output terminal 46, a digital (USB) terminal 48 and a DC input terminal 50 on its side (opposite side to a grip).

This digital camera 10 can have an image-capturing mode or a reproduction mode selected by the image-capturing/reproduction selecting switch 24, and when in the image-capturing mode, the modes such as manual image-capturing, auto-image-capturing, animation and voice recorder can be selected by the image-capturing mode selecting dial 26. Moreover, the voice recorder mode is the mode for recording only the voice.

The liquid crystal monitor 36 can be used as an electronic view finder, and it can also display a captured image and a reproduced image and so on read from a memory card loaded on the camera. The liquid crystal monitor 36 has the information such as the number of capturable frames and a reproduced frame number, whether or not there is an electric flash light, a macro mode, recorded image quality and the number of pixels displayed, and further has various menus and so on displayed according to an operation of the menu/OK switch 34 and the cross key 28.

Figure 8:
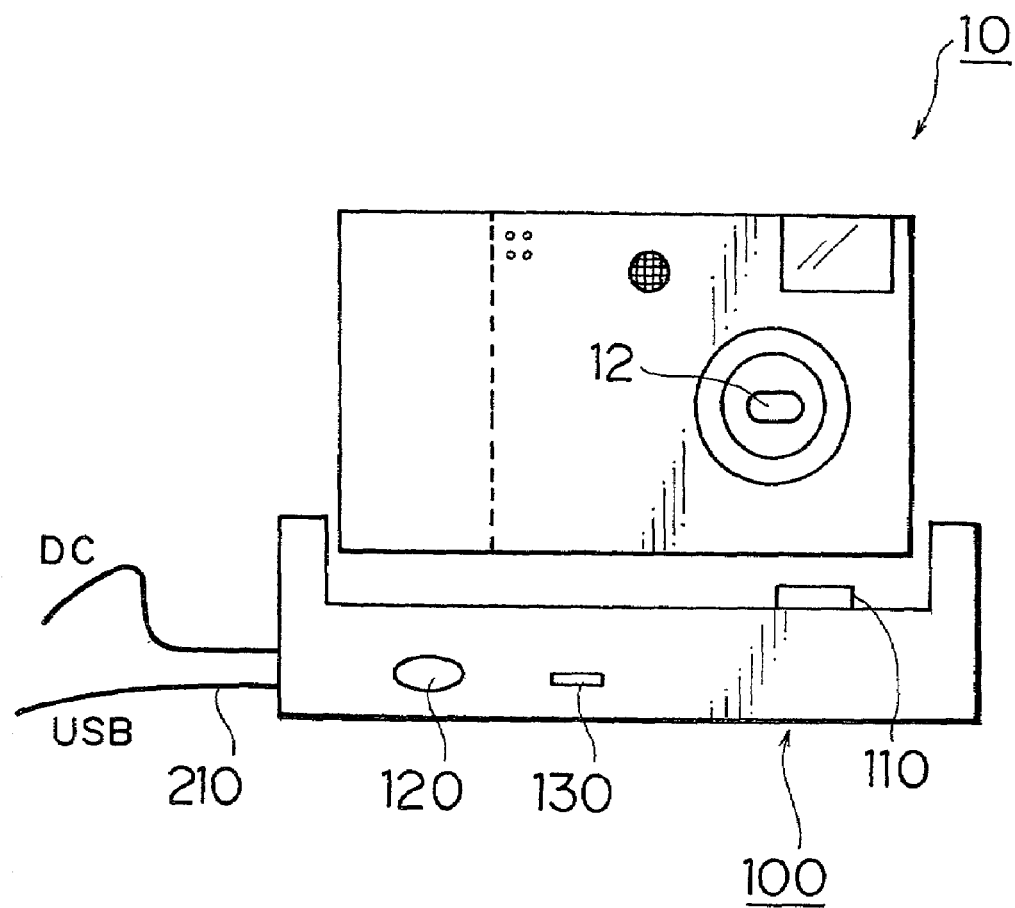
FIG. 8 is a front view of the digital camera and the cradle related to the present invention.

FIG. 8 is a front view of the digital camera 10 and the cradle 100.

As shown in FIG. 8, the cradle 100 has a recess 102 for guiding the digital camera 10 when mounting and demounting the camera, and a cradle connector 110 is placed on the bottom of the recess 102.

The cradle 100 has a power supply switch 120 and a cradle LED 130 provided on its front, and it also has a USB jack 140 on which a plug of the USB cable 210 is mounted and demounted and a DC jack 150 (see FIG. 9) on which the plug of the AC adapter 220 is mounted and demounted provided on its back.

And if the digital camera 10 is mounted on the recess 102 of the above described cradle 100, the camera connector 44 (see FIG. 6) placed on the bottom of the camera is connected to the cradle connector 110 in synchronization with the operation of mounting.

Figure 9:
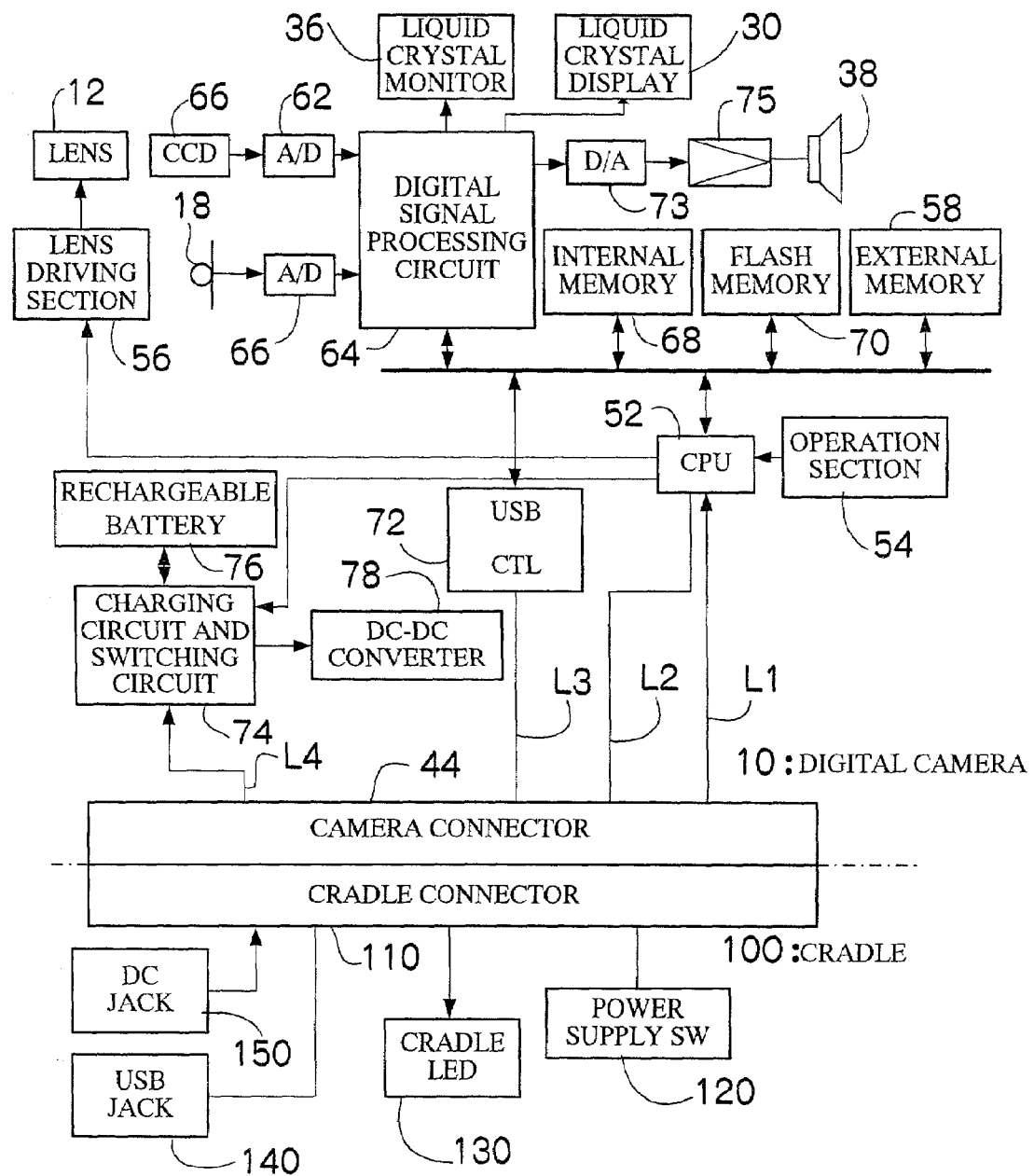
FIG. 9 is a block diagram showing an internal configuration of the digital camera and the cradle shown in FIG. 8.

FIG. 9 is a block diagram showing an internal configuration of the digital camera 10 and the cradle 100.

In FIG. 9, a central processing unit (CPU) 52 has control over each circuit in the digital camera 10 based on input from an operation section 54 including the aforementioned image-capturing/reproduction mode selecting switch 24, image-capturing mode selecting dial 26, cross key 28, back switch 32, menu/OK switch 34, power supply switch 40, shutter button 42 and so on.

First, if the power supply switch 40 is operated, the CPU 52 detects it and turns on the power supply in the camera. Moreover, in the case where the image-capturing mode is selected by the image-capturing mode selecting dial 26 and no USB connection is made with the personal computer and so on, a command for opening the lens cover not shown and letting out the taking lens 12 from the body-contained position to a taking position is outputted to a lens driving section 56 to implement it so as to be in an image-capturing standby state.

If the shutter button 42 is pushed when it is in the above image-capturing standby state, the CPU 52 detects it and has still image-capturing or animation image-capturing selected by the image-capturing mode selecting dial 26 performed, and has the image data acquired thereby recorded by an external memory 58 such as the memory card. To be more specific, the CPU 52 performs focus control and iris control via the lens driving section 56, and has an image formed by object light on a light-receiving face of a charge coupled device (CCD) 60 via the taking lens 12.

The CCD 60 converts the object light of which image is formed on the light-receiving face into a signal charge of an amount in accordance with its quantity of light. The signal charges thus accumulated are sequentially read as voltage signals in accordance therewith. The voltage signals sequentially read from the CCD 60 are added to an A/D converter 78, and converted into digital R, G and B signals here to be outputted to a digital signal processing circuit 64.

The digital signal processing circuit 64 performs predetermined image processing such as a synchronization process for simultaneously converting the R, G and B signals in order of points added from an A/D converter 62, a white balance adjustment, gamma control and YC signal processing, and furthermore, a luminance signal Y and chroma signals Cr and Cb (YC signals) created by the YC signal processing are compressed in a predetermined format and then recorded in the external memory 58. Moreover, when shooting the animation, the voice is detected by the microphone 18, and its detection signal (sound signal) is converted into a digital signal by an A/D converter 66 and then is added to the digital signal processing circuit 64. And the digital signal processing circuit 64 records voice data in the external memory 58 together with the image data. An internal memory 68 has raw data of R, G and B before the signal processing, the YC signals and so on temporarily stored therein, and a flash memory 70 has a program, constants and so on for camera control stored therein.

On the other hand, in the case where the reproduction mode is selected by the image-capturing mode selecting dial 26 and no USB connection is made with the personal computer and so on, compressed data of the final image file (a first frame in the case of an animation file) recorded in the external memory 58 is read first, and is extended to an uncompressed YC signal by the digital signal processing circuit 64 and then converted into a color composite video signal to be outputted to the liquid crystal monitor 36. Thus, the liquid crystal monitor 36 displays a frame image of the final file recorded in the external memory 58. If image reproduction is started by operating the operation section 54 in a state of displaying one frame of the animation, the animation is reproduced on the above described liquid crystal monitor 36 and also the voice data is outputted to the speaker 38 via a D/A converter 73 and an amplifier 75 so as to reproduce the recorded voice simultaneously with the animation.

The frames can be shifted forward or backward by operating right and left keys of the cross key 28, and the image file of a shifted frame position is read from the external memory 58, and a still image and the animation are reproduced on the liquid crystal monitor 36 just as described above.

On the other hand, the cradle 100 has the power supply switch 120, the cradle LED 130, the USB jack 140 and the DC jack 150 provided thereon as previously mentioned, and these are electrically connected to the cradle connector 110. To be more specific, as shown in FIG. 10, the power supply switch 120, the cradle LED 130, the USB jack 140 and the DC jack 150 are connected one-on-one to the terminals in the cradle connector 110 respectively.

The camera connector 44 of the digital camera 10 also has the terminals corresponding to those of the above described cradle connector 110 respectively. And if the digital camera 10 is mounted on the cradle 100, each terminal of the camera connector 44 is electrically connected to each terminal of the cradle connector 110.

Next, a camera operation in a state of having the digital camera 10 mounted on the cradle 100 will be described.

Figure 10:
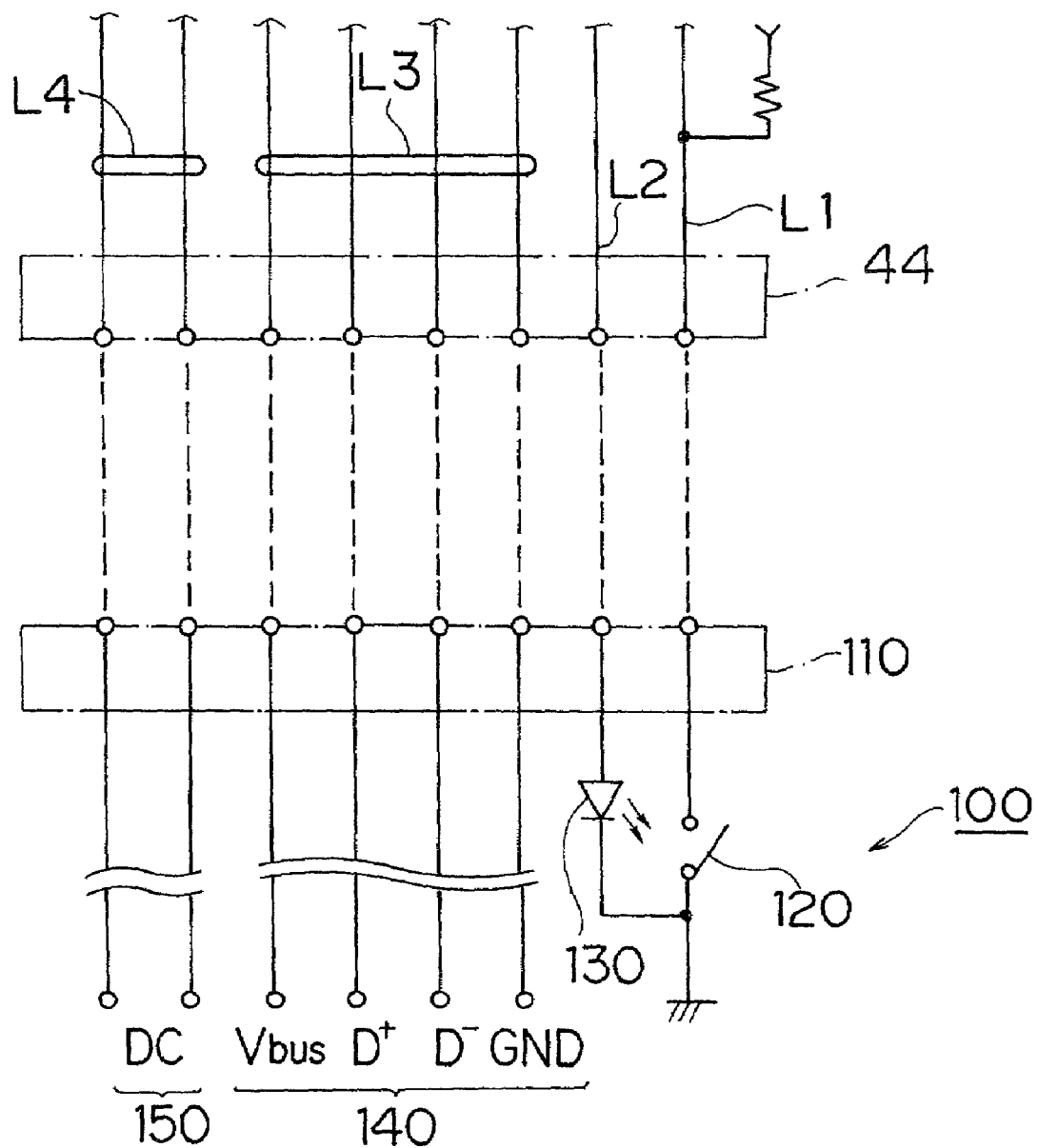
FIG. 10 is a drawing showing a connector portion of the above described digital camera and the cradle.

First, in the case where the digital camera 10 is mounted on the cradle 100 in a state of having the power supply of the digital camera 10 turned off, turning on the power supply switch 120 on the cradle side makes a line L1 pulled up as shown in FIG. 10 low-level. The CPU 52 detects it and turns on the power supply in the camera. Moreover, as for another embodiment of the power supply switch on the cradle side, it may be the switch for connecting and shutting down a $V_{bus}$ line of a USB terminal. To be more specific, it is feasible that the CPU 52 turns on and off the camera power supply by monitoring voltage of the $V_{bus}$ of the USB terminal.

While the power supply switch 40 on the camera side is provided on the topside of the camera as shown in FIG. 5 in this embodiment, it may also be provided on the back. In this case, in the state of having the digital camera 10 mounted on the cradle 100, it is easier to turn on and off the camera power supply by the power supply switch 120 on the cradle side than by the power supply switch on the camera side.

The CPU 52 detects whether or not the digital camera 10 is mounted on the cradle 100, and changes the camera operation mode when the power is on according to the detected contents. To be more specific, in the case where the power supply is turned on by the power supply switch 40 without the digital camera mounted on the cradle 100, it starts up correspondingly to the mode set by the image-capturing/reproduction mode selecting switch 24 or the image-capturing mode selecting dial 26. For instance, in the case where the auto-image-capturing mode is set, the camera power supply is turned on to open the lens cover and let out the taking lens 12 so as to be in the image-capturing standby state. Moreover, in the case where the reproduction mode is set, the camera power supply is turned on to read the image data from the external memory 58 and reproduce the image on the liquid crystal monitor 36.

On the other hand, in the case where the power supply is turned on by the power supply switch 120 on the cradle side with the digital camera 10 mounted on the cradle 100, it starts up in a communication mode (USB mode). And in the case where the digital camera 10 is USB-connected, it automatically starts the communication. Moreover, the digital camera 10 determines whether or not USB-connected to the personal computer side by monitoring pull-up on/off of D+ of the USB terminal. The digital camera 10 behaves as two types of apparatuses in different device classes according to a USB setting state of the camera body when USB-connected. To be more specific, as for the above USB mode, there are a USB mass storage class mode for having the digital camera 10 function as a card reader and a USB camera mode for having it function as a PC camera, where one of the modes is set in advance in the camera's setup. In the case where the USB setting is the card reader, the image data recorded in the external memory 58 is read and sent as appropriate, and in the case where the USB setting is the PC camera, animation data that is currently captured is successively sent so as to be capable of a video conference and so on.

Moreover, it is possible to determine whether or not the digital camera 10 is mounted on the cradle 100 by a detected output of a cradle detection switch that is not shown or by which of the power supply switch 40 on the camera side and the power supply switch 120 on the cradle side was used to turn on the power. Furthermore, in the case where the power supply of the digital camera 10 is turned on and then the digital camera 10 is mounted on the cradle 100, it is possible to change the camera operation mode as described above when mounting it.

On the other hand, in the case where the digital camera 10 is not USB-connected while it is mounted on the cradle 100 and the camera power supply is on (in the case where a USB cable 210 is off the cradle 100 or the personal computer 200, or in the case where the power of the personal computer 200 is off), it gives a warning to the user by displaying to that effect on the liquid crystal monitor 36 or the liquid crystal display 30.

The cradle LED 130 is connected to the CPU 52 via the cradle connector 110, the camera connector 44 and a line L2, and displays various states of the camera according to the signals inputted from the CPU 52. To be more specific, the cradle LED 130 is controlled to light up or go out according to an on/off state of the camera power supply. It is controlled to blink in the case where the digital camera 10 and the personal computer 200 are in a USB operation state, and is controlled to intermittently light up in the case of USB remove OK. Moreover, while icons or characters are displayed on the liquid crystal display 30 to show that they are in the USB operation, it is also feasible to stop the display operation of the liquid crystal display 30 in the case where they are displayed on the above cradle LED 130.

The USB jack 140 is connected to a USB controller 72 (FIG. 9) via the cradle connector 110, the camera connector 44 and a line L3. If the CPU 52 verifies the USB connection when the camera power supply is on, as previously mentioned, it automatically sets the camera operation mode at the USB mode and starts USB communication via the USB controller 72.

The DC jack 150 is connected to a charging circuit and a switching circuit 74 via the cradle connector 110, the camera connector 44 and a line L4. Accordingly, if the DC power is supplied to the DC jack 150 from the AC adapter 220 (FIG. 1), this DC power is supplied to the charging circuit and the switching circuit 74. If the DC power is supplied when the camera power supply is off, the charging circuit and the switching circuit 74 start the charging operation to a charging battery 76, and stops the charging operation when the charging battery 76 is fully charged.

On the other hand, the charging circuit and the switch circuit 74 do not perform the above charging operation when the camera power supply is on, and switches the DC power inputted from the DC input terminal so as to supply it to a DC-DC converter 78 according to the command from the CPU 52. The DC-DC converter 78 generates various voltage powers required by each circuit from the inputted DC power and supplies it to each circuit in the camera.

It is also feasible to give the digital camera 10 the function of determining whether or not the DC power is inputted via the cradle 100, so that it is allowed to turn on the camera power supply by the power supply switch 120 on the cradle side only in the case where it is determined that the digital camera 10 is mounted on the cradle 100 and is inputting the DC power via the cradle 100. Thus, it is possible to avoid a problem of the camera power supply becoming off due to consumption of the battery during the communication.

Moreover, while the A/V output terminal 46 (see FIG. 7) is provided only on the camera side in this embodiment, it is also feasible to provide another A/V output terminal to the aforementioned camera connector 44. In this case, the A/V input terminal to be connected to the above described other A/V output terminal and an A/V output jack to be connected to an A/V cable are provided to the cradle connector 110.

It is needless to say that the above digital camera 10 also operates just as described above in the case where the plugs of the USB cable 210 and the AC adapter 220 are inserted into the USB terminal 48 and the DC input terminal 50 shown in FIG. 7 respectively.

As described above, it is possible to automatically connect communication terminals just by mounting the digital camera on the cradle, and thus two-way communication with the personal computer and so on becomes possible. If the digital camera is mounted on the cradle, it is possible to prevent the camera operation different from what the user intended because the camera operation mode is automatically changed to the one suitable for using the cradle, irrespective of the operation mode of the camera body.

In the case where the two-way communication with the personal computer is impossible in spite of the digital camera mounted on the cradle, it is thinkable that the power of the personal computer is not on or the communication cable is off, and it is possible to give a warning thereof and prompt the user to take appropriate measures. Furthermore, if the digital camera is mounted on the cradle, it is also possible to turn on and off the camera power supply by the power supply switch provided on the cradle, and in the state of having the digital camera mounted on the cradle, the camera power supply can easily be turned on and off by the power supply switch on the cradle side even in the case where the power supply switch on the camera body side is hard to operate. Moreover, in the case where the camera power supply is turned on by this power supply switch, it is also possible to automatically set it at the communication mode.

Furthermore, as it allows the camera power supply to be turned on by the power supply switch on the cradle side only when the camera power is supplied via the cradle, it can prevent the problem of the camera power supply becoming off due to consumption of the battery during the communication.

As the display device is provided on the cradle side, it is easy, in the state of having the digital camera mounted on the cradle, to check by the display device on the cradle side the communication state (in communication, remove OK) or the on or off state of the camera even in the case where it is difficult to do so by the display device on the camera body side.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera to be mounted on a cradle having a first communication terminal through which an external apparatus capable of two-way communication is connectable via a detachable communication cable so that the digital camera performs two-way communication with the external apparatus when so connected, the digital camera comprising:
    a second communication terminal which is connected to the first communication terminal when the digital camera is mounted on the cradle; and
    a detection device which detects the digital camera being mounted on the cradle; and
    at least one of an image display device and a character display device,
    wherein if communication between the digital camera and the external apparatus does not occur when the detection device detects the digital camera being mounted on the cradle, the at least one of the image display device and the character display device displays an warning.

2. A digital camera to be mounted on a cradle having a first communication terminal through which an external apparatus capable of two-way communication is connectable via a detachable communication cable so that the digital camera performs two-way communication with the external apparatus when so connected, the digital camera comprising:
    a second communication terminal which is connected to the first communication terminal when the digital camera is mounted on the cradle; and
    a device which turns a camera power supply on and off according to an operation of a power supply switch provided at the cradle.

3. The digital camera according to claim 2, wherein when the camera power supply is turned on by the operation of the power supply switch provided at the cradle, the digital camera sets an operation mode thereof at a communication mode for communicating with the external apparatus.

4. The digital camera according to claim 2, further comprising a second terminal which is connected to a first terminal provided at the cradle when the digital camera is mounted on the cradle, a signal according to the operation of the power supply switch being outputted through the first terminal.

5. A digital camera to be mounted on a cradle having a first communication terminal through which an external apparatus capable of two-way communication is connectable via a detachable communication cable so that the digital camera performs two-way communication with the external apparatus when so connected, the digital camera comprising:
    a second communication terminal which is connected to the first communication terminal when the digital camera is mounted on the cradle;
    a power input terminal which is connected to a power output terminal provided at the cradle when the digital camera is mounted on the cradle, DC power being outputted through the power output terminal; and
    a charging device which charges a battery in the digital camera by the DC power inputted through the power input terminal when the camera power supply is turned off, the charging device prohibiting charging of the battery when the camera power supply is turned on.

6. The digital camera according to claim 5, wherein:
    the cradle has a recess which guides the digital camera;
    the power output terminal of the cradle is arranged at a bottom of the recess;
    the power input terminal of the digital camera is arranged at a bottom of the digital camera; and
    the power input terminal of the digital camera is connected to the power output terminal of the cradle in synchronization with operation of mounting the digital camera on the cradle.

7. A cradle which connects a digital camera to an external apparatus capable of two-way communication, the cradle comprising:
    a camera mounting section on which the digital camera is removably mounted;
    a first communication terminal which is connected to the external apparatus via a detachable communication cable, the first communication terminal being connected to a second communication terminal provided at the digital camera when the digital camera is mounted on the digital camera mounting section;
    a display input terminal which is connected to a display output terminal provided at the digital camera when the digital camera is mounted on the digital camera mounting section, a display signal being outputted through the display output terminal; and
    a display device which displays at least one of a communication state between the digital camera and the external apparatus and an on/off state of the camera power supply according to the display signal inputted through the display input terminal.

8. A camera system, comprising:
    a digital camera comprising a second communication terminal through which two-way communication with an external apparatus is performed; and
    a cradle comprising:
    a camera mounting section on which the digital camera is removably mounted; and
    a first communication terminal which is connected to the external apparatus via a detachable communication cable,
    wherein the first communication terminal and the second communication terminal are connected to each other when the digital camera is mounted on the camera mounting section;
    the digital camera further comprises:
    a detection device which detects the digital camera being mounted on the cradle; and
    at least one of an image display device and a character display device,
    wherein if communication between the digital camera and the external apparatus is impossible when the detection device detects the digital camera being mounted on the cradle, the at least one of the image display device and the character display device displays an warning.

9. A camera system, comprising:
a digital camera comprising a second communication terminal through which two-way communication with an external apparatus is performed; and
a cradle comprising:
a camera mounting section on which the digital camera is removably mounted; and
a first communication terminal which is connected to the external apparatus via a detachable communication cable,
wherein the first communication terminal and the second communication terminal are connected to each other when the digital camera is mounted on the camera mounting section;
the cradle further comprises a power supply switch; and
the digital camera further comprises a device which turns a camera power supply on and off according to an operation of the power supply switch of the cradle.

10. The camera system according to claim 9, wherein when the camera power supply is turned on by the operation of the power supply switch provided at the cradle, the digital camera sets an operation mode thereof at a communication mode for communicating with the external apparatus.

11. The camera system according to claim 9, wherein:
the cradle further comprises a first terminal through which a signal according to the operation of the power supply switch is outputted;
the digital camera further comprises a second terminal which is connected to the first terminal; and
the first terminal and the second terminal are connected to each other when the digital camera is mounted on the camera mounting section.

12. A camera system, comprising:
a digital camera comprising a second communication terminal through which two-way communication with an external apparatus is performed; and
a detection device that automatically changes an operation mode of the camera to communicate with the external apparatus; and
a cradle comprising:
a camera mounting section on which the digital camera is removably mounted; and
a first communication terminal which is connected to the external apparatus via a detachable communication cable,
wherein the first communication terminal and the second communication terminal are connected to each other when the digital camera is mounted on the camera mounting section the digital camera further comprises an audio/video output terminal and an audio/video input terminal, where the audio/video output terminal and the audio/video input terminal are connected to each other when the digital camera is mounted on the camera mounting section, wherein
the audio/video output terminal of the digital camera is arranged at a bottom of the digital camera;
the digital camera mounting section of the cradle has a recess which guides the digital camera;
the audio/video input terminal of the cradle is arranged at a bottom of the recess; and
the audio/video output terminal of the digital camera and the audio/video input terminal of the cradle are connected to each other in synchronization with operation of mounting the digital camera on the cradle.

* * * * *